(12) United States Patent
Viswanathan et al.

(10) Patent No.: US 11,200,300 B2
(45) Date of Patent: Dec. 14, 2021

(54) SECURE SHARING OF LICENSE DATA IN COMPUTING SYSTEMS

(71) Applicant: Microsoft Technology Licensing, LLC, Redmond, WA (US)

(72) Inventors: Giridhar Viswanathan, Redmond, WA (US); Sudeep Kumar Ghosh, Kirkland, WA (US); Ankit Srivastava, Seattle, WA (US); Michael Trevor Pashniak, Newcastle, WA (US); Benjamin M Schultz, Bellevue, WA (US); Balaji Balasubramanyan, Redmond, WA (US); Hari R Pulapaka, Redmond, WA (US); Tushar Suresh Sugandhi, Redmond, WA (US); Matthew David Kurjanowicz, North Bend, WA (US); Ahmed Saruhan Karademir, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 273 days.

(21) Appl. No.: 16/013,816

(22) Filed: Jun. 20, 2018

(65) Prior Publication Data

US 2019/0392117 A1 Dec. 26, 2019

(51) Int. Cl.
*G06F 21/10* (2013.01)
*H04L 9/08* (2006.01)
*H04L 9/30* (2006.01)

(52) U.S. Cl.
CPC ............ *G06F 21/105* (2013.01); *H04L 9/085* (2013.01); *H04L 9/0877* (2013.01); *H04L 9/0891* (2013.01); *H04L 9/30* (2013.01); *G06F 2221/0755* (2013.01)

(58) Field of Classification Search
CPC .......... G06F 21/105; G06F 2221/0755; G06F 21/121; G06F 21/606; H04L 9/085; H04L 9/0877; H04L 9/0891; H04L 9/30
See application file for complete search history.

(56) References Cited

U.S. PATENT DOCUMENTS 7,313,512 B1 12/2007 Traut et al.
7,747,531 B2 * 6/2010 Cronce ................. G06F 21/121
705/59

(Continued)

OTHER PUBLICATIONS

"International Search Report and Written Opinion Issued in PCT Application No. PCT/US19/036437", dated Sep. 4, 2019, 12 Pages.

*Primary Examiner* — Daniel B Potratz
*Assistant Examiner* — Wansik You
(74) *Attorney, Agent, or Firm* — Liang IP, PLLC

(57) ABSTRACT

Techniques for secure sharing of data in computing systems are disclosed herein. In one embodiment, a method includes when exchanging data between the host operating system and the guest operating system, encrypting, at a trusted platform module (TPM) of the host, data to be exchanged with a first key to generate encrypted data. The method also includes transmitting the encrypted data from the host operating system to the guest operating system and decrypting, at the guest operating system, the transmitted encrypted data using a second key previously exchanged between the TPM of the host and a virtual TPM of the guest operating system.

20 Claims, 7 Drawing Sheets

(56) References Cited

U.S. PATENT DOCUMENTS

| | | | | |
|---|---|---|---|---|
| 8,751,800 | B1* | 6/2014 | Dorwin | H04L 63/102 |
| | | | | 713/167 |
| 8,831,217 | B2* | 9/2014 | Blankenbeckler | ............................ |
| | | | | G11B 20/00123 |
| | | | | 380/201 |
| 8,977,842 | B1* | 3/2015 | McCorkendale | G06F 21/602 |
| | | | | 713/152 |
| 2006/0256108 | A1* | 11/2006 | Scaralata | G06F 9/45558 |
| | | | | 345/418 |
| 2009/0328056 | A1* | 12/2009 | McCune | G06F 21/105 |
| | | | | 718/105 |
| 2014/0373014 | A1 | 12/2014 | Smith et al. | |
| 2016/0180063 | A1 | 6/2016 | Bhandaru et al. | |
| 2016/0283160 | A1* | 9/2016 | Trika | G06F 3/0632 |

* cited by examiner

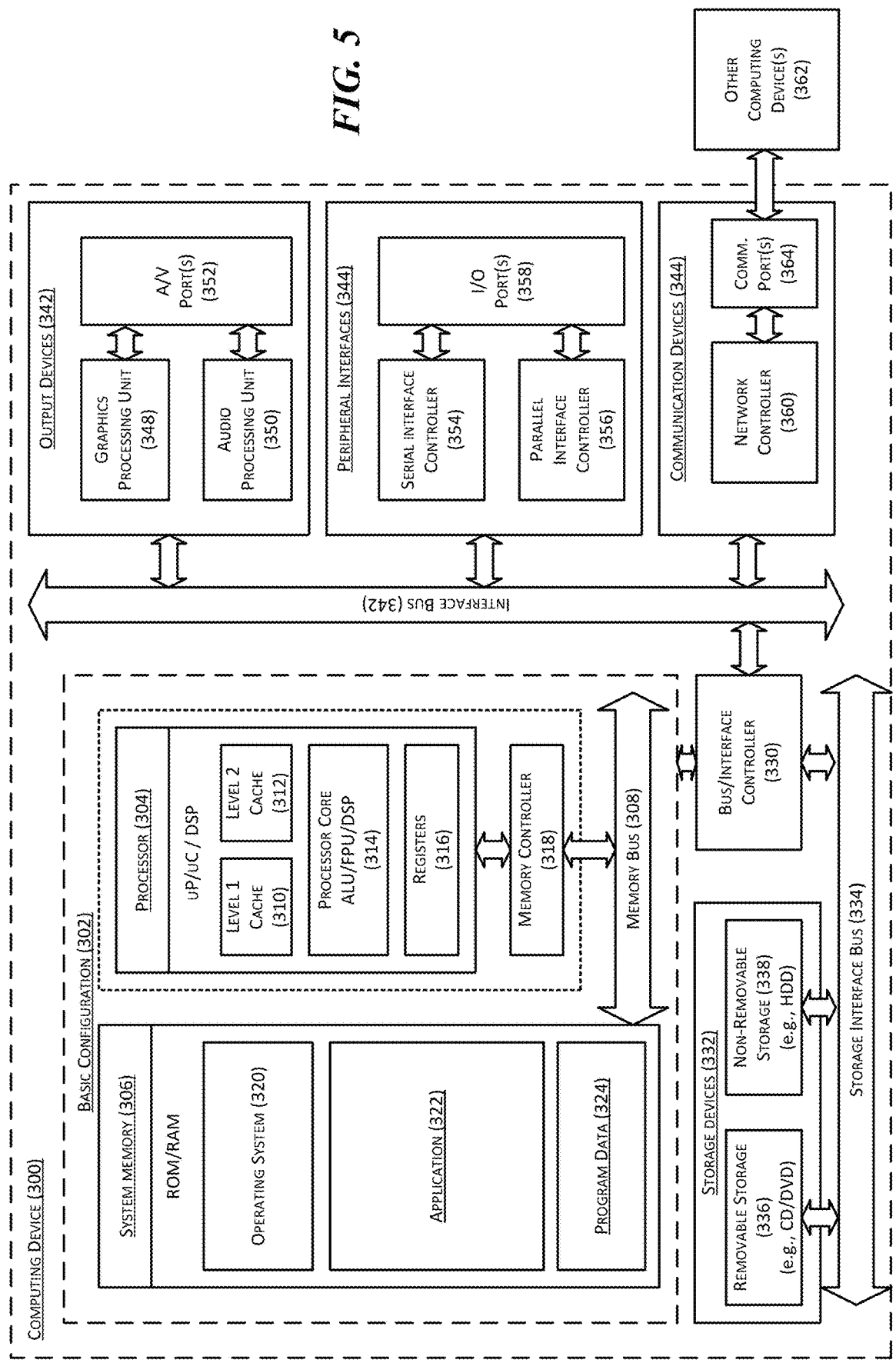

SECURE SHARING OF LICENSE DATA IN COMPUTING SYSTEMS

BACKGROUND

Containers, virtual machines, or other types of "guest operating systems" or "guests" can provide additional capabilities and flexibility to a host computer and/or a corresponding host computing operating system. Such guests typically run on a host computer that has a host operating system. In some scenarios, a security boundary isolates operations of the host operating system and the guests to limit access by the guests to certain resources such as storage on the host computer. In some scenarios, a guest operating system can maintain legacy files and configurations, and thus enabling compatibility with old software applications. In some scenarios, when the guest is not running, the guest also has the encapsulation capability to provide various application packaging techniques. These application packaging techniques facilitate distribution, installation, maintenance, configuration, removal, or other suitable operations of the applications. Sometimes an entire guest operating system with one or more pre-installed applications is used for packaging. As such, using guests to run various applications and workloads can help improve isolation and compatibility while reducing maintenance costs.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Though helpful in maintaining security boundaries, isolation of guests may present certain operating difficulties when certain data of sensitive information (e.g., license information, login credentials, personal data, etc.) is needed to perform an operation. For example, in many computing systems, licensing operations are run independently in each host or guest operating system. For instance, a host operating system can determine whether the applicant is permitted to be launched based on corresponding data of license information (e.g., a product key) or other trust attributes accessible to the host operating system. However, when launching the application inside a guest, a virtual machine or container may not have access to the same data of license information due to the isolation between the host and guest operation systems.

To provide a seamless user experience with applications, certain computing systems can provide sharing of data such as license information between a host operating system and corresponding guests. As such, a user can perform operations such as launching applications in multiple guests on a single host with just one product key in the host operating system. However, virtual machines and containers typically have built-in flexibility by design. For example, a virtual machine or container can be created, started, paused, resumed, and stopped. A virtual machine or container running an application can thus be paused and corresponding memory content can be copied with a "snapshot", a "clone", or other techniques from one host to another. The copied memory content can then be used to resume or relaunch the application on other hosts even though the other hosts may not have a valid license to launch the application. There is also an increased ability and convenience for guest operating systems to package applications. For example, some container operating systems have reduced startup times, disk footprint, and ease of deployment than previous implementations. These recent developments render the foregoing pause and resume operations much easier and at lower costs. Thus, the built-in flexibility of virtual machines and containers may present software piracy and/or security risks to software developers and/or users.

Several embodiments of the disclosed technology can address certain aspects of the foregoing challenge by implementing a license engine in a kernel mode of the host operating system to facilitate secured data exchange of, for instance, license information, between the host operating system and one or more guest operating systems on a host computer. In one implementation, during initialization of a guest operating system (e.g., a virtual machine or container), a virtual trusted platform module (vTPM) can be initialized in a kernel mode (e.g., by a hypervisor) in the guest and bound to a trusted platform module (TPM) or other suitable types of security module on the host computer. In one implementation, the TPM in the host computer can exchange with the vTPM an encryption key used for establishing a secure communications channel between the vTPM and the TPM. In other embodiments, the TPM can also generate an encryption/decryption key pair for the vTPM in the guest operating system according to asymmetric cryptography. The key or keys can contain a number of random bits (e.g., 2048) according to Rivest-Shamir-Adleman (RSA) or other suitable cryptography protocols.

During operation, sharing of data of license information between the host and guest operating systems may be needed. In one example, a user (or a script, a computing service, another software application, or other suitable types of entity) can request launching an application in a user mode of the initiated guest operating system. In certain implementations, upon receiving the request, a license proxy in a kernel mode of the guest can be configured to request, from the license engine in the host operating system, data of license information corresponding to the application. The vTPM can be configured to use the previously exchanged key to encrypt the request before the encrypted request is transmitted to the license engine in the host operating system.

The license engine can then receive the encrypted request and ask the TPM to decrypt the encrypted request with the key in the TPM. Upon decrypting the request, the license engine can be configured to determine whether the requested data of license information is present in the host operating system. In response to determining that the requested data of license information is not present, the license engine can return an error message. Otherwise, the license engine can request the TPM to encrypt the requested data of license information with the key to generate a package of secured data containing the license information (or "license blob"). In certain embodiments, the license blob can have a time-to-live value (e.g., 1 day). Expiration of the time-to-live value can cause the license blob to be deleted from memory. In other embodiments, the license blob may expire over other suitable periods. In further embodiments, the license blob can also contain data representing event based licenses. For example, a license is provided when a given file is open, a hardware component (e.g., a wireless interface card) is disconnected, or when a user is in a given physical location or region. The license engine can then transmit the encrypted license blob to the guest operating system. In some embodiments, the event-based license expires when the event no longer holds true. For example, when a given file is closed or a user leaves a given physical location or region, the corresponding event-based license would expire.

Upon receiving the encrypted license blob, the license proxy in the guest operating system can request the vTPM to decrypt the received license blob using the key previously shared to extract the license information contained therein. The license proxy can then query the decrypted license information for a product key, permission, permission level, or other suitable license information regarding the application. Once license information is obtained, the license proxy can then provide a permission to, for example, launch the application in response to the user request in the user mode.

In other implementations, instead of requesting the license blob from the license engine, the license proxy in the guest can be configured to request encryption of the launch request by the vTPM with the previously exchanged key and transmit the encrypted launch request to the license engine for processing. Upon receiving the encrypted launch request, the license engine can be configured to request the TPM to decrypt the launch request. Based on the decrypted launch request, the license engine can be configured to query for corresponding license information on the host operating system. Upon locating suitable license information, the license engine can generate a license response (e.g., containing a permission, a permission level, or a denial). The TPM can then encrypt the license response before the license engine transmits the license response to the license proxy. In turn, the license proxy can request the vTPM to decrypt the license response and perform operations (e.g., launching the application) accordingly. In some embodiments, the encrypted license blob can be cached in the guest operating system. In such embodiments, the license check operation described above would be managed by the license proxy and dependent on the validity of the key in the license proxy to decrypt the cached encrypted license blob to perform the license check operation.

The foregoing secure data exchange between the host and guest operating systems can reduce or prevent software piracy and/or protect data security when the user pauses the guest operating system on the original host and copy corresponding memory content to a new host. In one aspect, applications running in a user mode on a guest operating system typically has no access to the license proxy or the vTPM in a kernel mode of the operating system. As such, data related to license operations may not be captured using the snapshot or other copying techniques. In another aspect, even assuming, that a user can capture and copy data from the license proxy and the vTPM, the copied data would not allow launching the application on a new host because the vTPM is bound to the TPM of an existing host. Thus, upon an attempt to launch the application on the new host, the copied vTPM would not be bound to the original TPM anymore and would be unable to facilitate proper communications between the license proxy and another license engine on the new host operating system.

Several embodiments of the disclosed technology can thus safeguard data of sensitive information stored in and/or accessible by only the host operating system. When sharing any sensitive information with a guest operating system, the shared data is encrypted with the previously exchanged key between the TPM and vTPM that is bound to the TPM. Thus, even if the vTPM is moved to another host computer, the lack of binding to the original TPM would still prevent decryption of the license blob in the guest operating system. As such, data security of the sensitive information can be protected.

BRIEF DESCRIPTION OF THE DRAWINGS

FIG. 5 is a computing device suitable for certain components of the computing device in FIG. 1.

DETAILED DESCRIPTION

Figure 1:
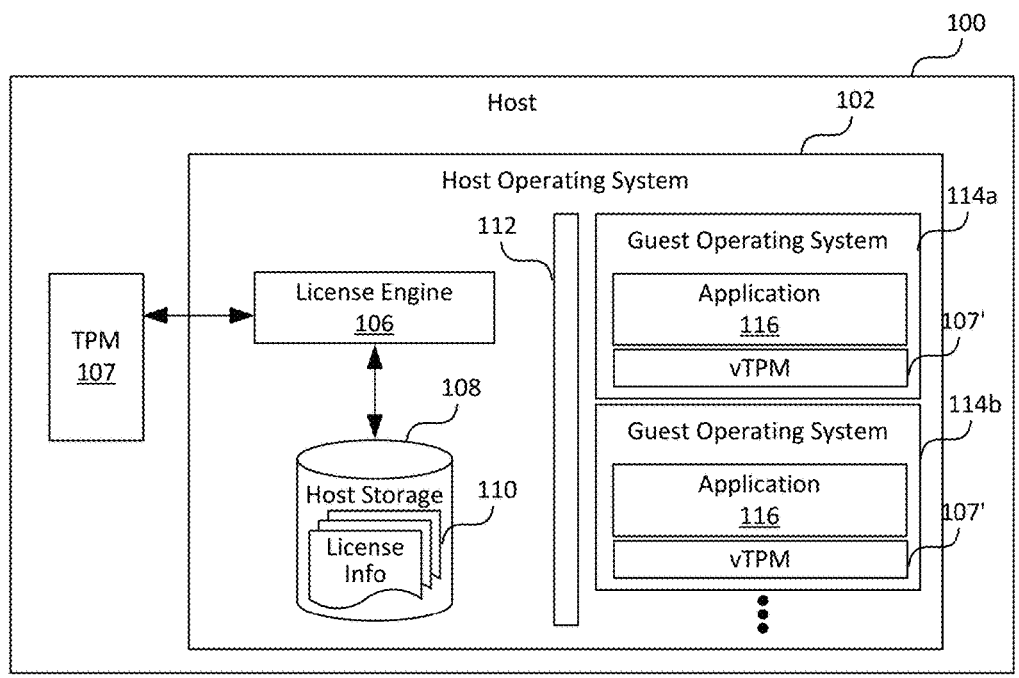
FIG. 1 is a schematic diagram illustrating a host having a license engine configured to facilitate secure data exchange with one or more guest operating systems in accordance with embodiments of the disclosed technology.

Certain embodiments of systems, devices, components, modules, routines, data structures, and processes for secure data exchange between host and guest operating systems on a host computing device are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-5.

As used herein, a "host computing device" or "host" generally refers to a computing device configured to implement, for instance, one or more virtual machines, containers, or other suitable virtualized components. For example, a host can include a server having a hypervisor configured to support one or more virtual machines, containers, or other suitable types of virtual components. The one or more virtual machines or containers can be used to launch and execute suitable applications or computer programs to provide corresponding computing services.

Also used herein, a "host operating system" generally refers to an operating system deployed to interact directly with hardware components of a computer device (e.g., a server, a laptop, a phone). A hypervisor (e.g., a hosted hypervisor) can run on top of a host operating system rather than interacting directly with the hardware components of the computing device. The hypervisor can then create, manage, or otherwise support one or more virtual machines (VMs) or containers each having a "guest operating system" or "guest." In certain implementations, a guest operating system may not be the same as a host operating system supporting the guest operating system.

Also used herein, "asymmetric cryptography" generally refers to a cryptographic technique that uses pairs of public and private keys. Public keys may be shared with other entities while private keys are accessible only to a host operating system. Entities may use a public key to encrypt data of sensitive information via integer factorization, discrete logarithm, elliptic curve, or other suitable mathematical relationships. Corresponding private key can then be used to decrypt the encrypted data at the host operating system. In contrast, "symmetric cryptography" generally refers to a cryptographic technique that uses a single key for both encryption and decryption. For example, a pair of end points can securely exchange communications by encrypting and decrypting data using the same key. Examples of cryptographic keys can include a 2048-bit RSA or other suitable types of keys.

In the following description, license information is used as an example of sensitive information that a host operating system may not be willing to share publicly. Other examples of sensitive information can include login credentials, personal information (e.g., name, address, social security number, etc.), financial information, or other private information. As used herein, "license information" or "license info" generally refers to digital data representing a license key or software key that permits installation, execution, or other suitable operations related to an application, a computer program, a cloud service, etc. In one example, license information can include a software key that includes a series of alphanumerical characters. In other examples, license information can include digital data of hash values or other suitable types of data.

As described in more detail later, license information can be stored on a host computing device to be accessible only by a host operating system. When a user requests operations (e.g., launch) of an application in a user mode in a guest operating system, the host operating system can be configured to share the license information with the guest operating system. As such, a user can launch applications in multiple guest operating systems on a single host computer with just one licensing key in the host operating system.

However guest operating systems, such as virtual machines and containers, typically have built-in flexibility by-design. For example, a virtual machine or container can be created, started, paused, resumed, and stopped. A virtual machine or container can thus be paused and associated memory content can be copied with a "snapshot", a "clone", or other techniques from one host to another. The copied virtual machine or container can then be resumed on the another host even though the another host may not have a valid license to launch the application. Thus, the built-in flexibility of guest operating systems may present software piracy risks to software developers. In accordance with embodiments of the disclosed technology, a host operating system can be configured to reduce or even prevent unauthorized exportation or copying of the shared license information by encrypting the shared license information before sharing with the guest operating system, as described in more detail below with reference to FIGS. 1-5.

FIG. 1 is a schematic diagram illustrating a host 100 having a license engine configured to facilitate secure data exchange with one or more guest operating systems in accordance with embodiments of the disclosed technology. The host 100 can be a server, a desktop or laptop computer, a smart phone, or other suitable types of computing device. Though only particular components of the host 100 are shown in FIG. 1, in other embodiments, the host 100 can include additional and/or different hardware/software components, such as those example components described below with reference to FIG. 5.

As shown in FIG. 1, the host 100 can include a host operating system 102 having a license engine 106 interconnected to a host storage 108 containing records of sensitive information such as license information (shown in FIG. 1 as "license info 110"). The host storage 108 can include any suitable computer readable storage device configured to contain digital data. Example host storage 108 can include hardware/software components such as hard disk drives, solid state drives, and associated file systems. In the illustrated embodiment, records of the license info 110 are stored in the host storage 108. In other embodiments, records of the license info 110 can also be stored on a remote server (not shown) or other suitable locations accessible by the license engine 106 via a computer network such as the Internet.

Also shown in FIG. 1, the host operating system 102 can be configured to support one or more guest operating systems 114 (shown as guest operating systems 114a and 114b) individually executing one or more applications 116 in user mode. In certain embodiments, the host operating system 102 can be configured to provide a hypervisor and/or container engines (not shown) configured to support one or more virtual machines or containers individually having a corresponding guest operating system 114. In other embodiments, the host operating system 102 can also include virtual switches (not shown), virtual routers (not shown), or other suitable virtual components configured to facilitate operations of the guest operating systems 114 and/or corresponding applications 116. Two guest operating systems 114 each executing one application 116 are shown in FIG. 1 for illustration purposes. In other embodiments, the host operating system 102 can support three, four, or any other suitable numbers of guest operating systems 114 each executing suitable numbers of applications 116.

As shown in FIG. 1, a security boundary 112 isolates the guest operating systems 114 from the host operating system 102. The security boundary 112 can be implemented as a set of rules (not shown) in the host operating system 102 to limit or prevent the guest operating systems 114 and/or the corresponding applications 116 to access certain hardware/software resources in the host operating system 102. For example, as shown in FIG. 1, only the license engine 106 in a kernel mode (or other suitable components of the host operating system 102) has access to the license info 110 in the host storage 108. The guest operating systems 114 do not have direct access to the license info 110 in the host storage 108. In other embodiments, the security boundary 112 can also limit or prevent the guest operating system 114 from accessing additional compute, storage, network, or other suitable types of resources available to the host operating system 102. For example, though not shown in FIG. 1, the host operating system 102 and associated components, such as the license engine 106, can have a corresponding allocated memory (not shown) that is isolated from allocated memories of the one or more guest operating systems 114 by the security boundary 112.

In order to provide a seamless user experience with the applications 116 in the guest operating systems 114, the license engine 106 can be configured to securely share the license info 110 with the guest operating systems 114. For example, when a launch request 120 (shown in FIG. 2B) from a user 101 (shown in FIG. 2B) to launch an application 116 in a guest operating system 114 is received at a license proxy 106' (shown in FIG. 2A) in a guest operating system 114, the license proxy 106' can request the license engine 106 for a block of data or "blob" of license information (shown as "license blob 124 in FIG. 2C) based on the stored license info 110 in the host storage 108. In certain embodiments, the license blob 124 can have a time-to-live value. Expiration of the time-to-live can cause the blob to be deleted from memory. In other embodiments, the license blob 124 may never expire.

As described in more detail below with reference to FIGS. 2A-2E, in order to secure the shared license info 110 with the guest operating systems 114, the host 100 can include a trusted platform module or "TPM" 107 to facilitate encrypted data exchange by the license engine 106. The TPM 107 can include hardware circuitry with suitable firmware or software components configured to generate and/or store cryptography key pairs. In the illustrated embodiment, the TPM 107 is shown as separate from the license engine 106. In other embodiments, the TPM 107 may be integrated with the license engine 106. A suitable example TPM 107 is Intel Trusted Platform Module 2.0 provided by Intel Corporation of Santa Clara, Calif. Though the TPM 107 is used as an example of a cryptoprocessor for illustration purposes herein, in other embodiments, the host 100 can also include one or more other suitable types of cryptoprocessors in addition to or in lieu of the TPM 107.

Once encrypted, the license engine 106 can provide the generated license blob 124 to the guest operating systems 114, which can then decrypt the secured data with a previously exchanged key maintained at a virtual TPM (shown as "vTPM 107'" in FIG. 1) provided by, for example, a hypervisor in the host 100. Once decrypted, the license proxy 106' in the guest operating systems 114 can query the decrypted license information and allow launching or other operations of the application 116 accordingly. Via the exchange of one or more keys with the vTPM 107' at the guest operating systems 114, unauthorized copying of the shared data can be limited or even prevented, as described in more detail below with reference to FIGS. 2A-2E.

Though particular encryption/decryption operations using the TPM 107 and vTPM 107' are described herein, in other embodiments, the stored license info 110 and/or cryptography keys with an enclave memory that is an isolated region of code and data within an address space for an application 116. A suitable example of enclave memory is Secure Guard Extensions (SGX) memory provided by Intel Corporation of Santa Clara, Calif.

Figure 2A:
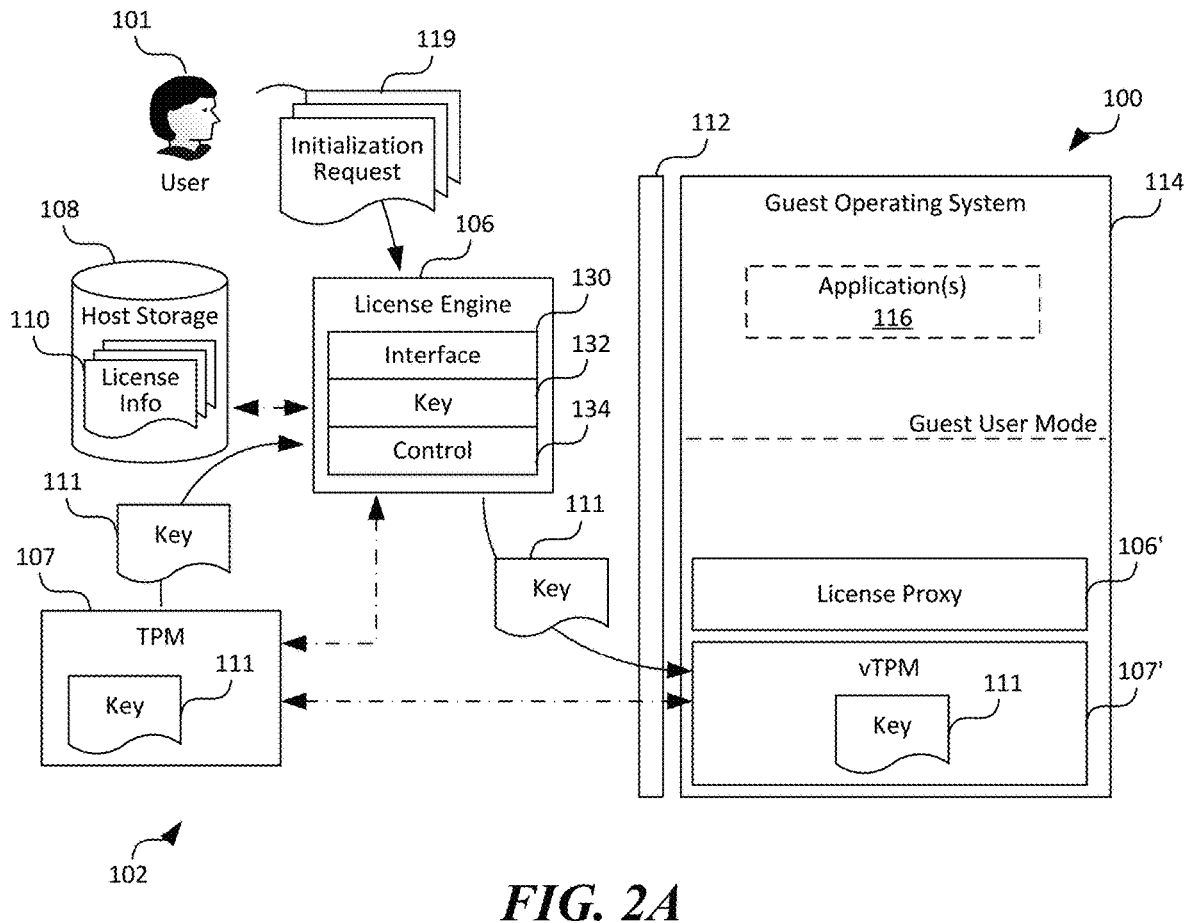
FIGS. 2A-2E are schematic diagrams of certain hardware/software components of the host of FIG. 1 during stages of operation in accordance with embodiments of the disclosed technology.

FIGS. 2A-2E are schematic diagrams of certain hardware/ software components of the host 100 of FIG. 1 during stages of operation in accordance with embodiments of the disclosed technology. In FIG. 2A and in other Figures herein, individual software components, objects, classes, modules, and routines may be a computer program, procedure, or process written as source code in C, C++, C #, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices.

Equally, components may include hardware circuitry. A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

Also shown in FIG. 2A, the license engine 106 can include an interface component 130, a key component 132, and a control component 134 operatively coupled to one another. Though the foregoing components are shown for illustration purposes, in other embodiments, the license engine 106 can also include additional and/or different components, modules, or routines, such as a license component 138 shown in FIGS. 3A and 3B. The interface module 130 can be configured to receive various types of requests from the guest operating system 114 or a user 101. For example, as shown in FIG. 2A, the interface component 130 can be configured to receive an initialization request 119 from the user 101 for initializing the guest operating systems 114 in the host 100. The user 101 can provide the initialization request 119 via a command line, graphical user interface, or other suitable interface elements (not shown). Upon receiving the initialization request 119, the interface component 130 can indicate to the key component 132 to initiate cryptography key generating and sharing operations.

The key component 132 can be configured to request the TPM 107 to generate a key (or a key pair) for each of the guest operating systems 114 via, for instance, a suitable application programming interface (API) or other suitable types of interface. In response, the TPM 107 can generate a key 111 corresponding to the guest operating system 114. Upon receiving the generated key 111, the key component 132 can be configured to share or transmit the generate key 111 to a vTPM 107' in the corresponding guest operating systems 114. In the illustrated embodiment, the key 111 is maintained in the TPM 107. In other embodiments, the key 111 may also be maintained in a memory location allocated to the host operating system 102, in an Unified Extensible Firmware Interface (UEFI), a SGX memory, or stored in other suitable locations accessible only to the host operating system 102 (FIG. 1). Even though the key 111 is described above as being generated in response to the initialization request 119, in other implementations, the key 111 may be pre-generated and/or pre-provisioned independent of receiving the initialization request 119.

In accordance with embodiments of the disclosed technology, upon initialization of the guest operating system 114, a license proxy 106' and a vTPM 107' can be generated and maintained in a kernel mode of the guest operating system 114. The license proxy 106' can be configured to receive and process requests for license information in the guest operating system 114 while the vTPM 107' can be configured to perform various cryptography operations, as described in more detail below.

During initialization, the vTPM 107' can be bound to the TPM 107 via a binding key, wrapping key, or other suitable techniques. For example, state of the vTPM 107' can be stored on the host 100 and be tied to the TPM 107. When the vTPM 107' starts running and tries to get or restore the corresponding state, the TPM 107 at the host 100 can validate if the vTPM 107' is a known instance on the host 102 before allowing the state restore. In another example, the TPM 107 of the host 100 can release keys 111 to the vTPM 107' only if the vTPM 107' does an attestation during which the TPM 107 can validate from attestation data if the vTPM 107' is a known vTPM before releasing the keys 111.

In a further example, the TPM 107 can provision a key pair or a key based on an initial attestation to the vTPM 107' during vTPM initialization. Following the initial attestation, before the TPM 107 releases any keys or secrets to the vTPM 107', the TPM 107 can query for proof of possession of the previously provisioned key pair or key for the vTPM 107'. As such, the vTPM 107' can have access to the TPM 107 via a secured communications channel. For example, the TPM 107 can provide the generated key 111 to the vTPM 107' using the secured communications channel during initialization. Even though a symmetric key 111 is illustrated in FIG. 2A, in other embodiments, the TPM 107 can also be configured to generate and share a key pair (i.e., a public key and a private key) with the vTPM 107' during initialization.

Figure 2B:
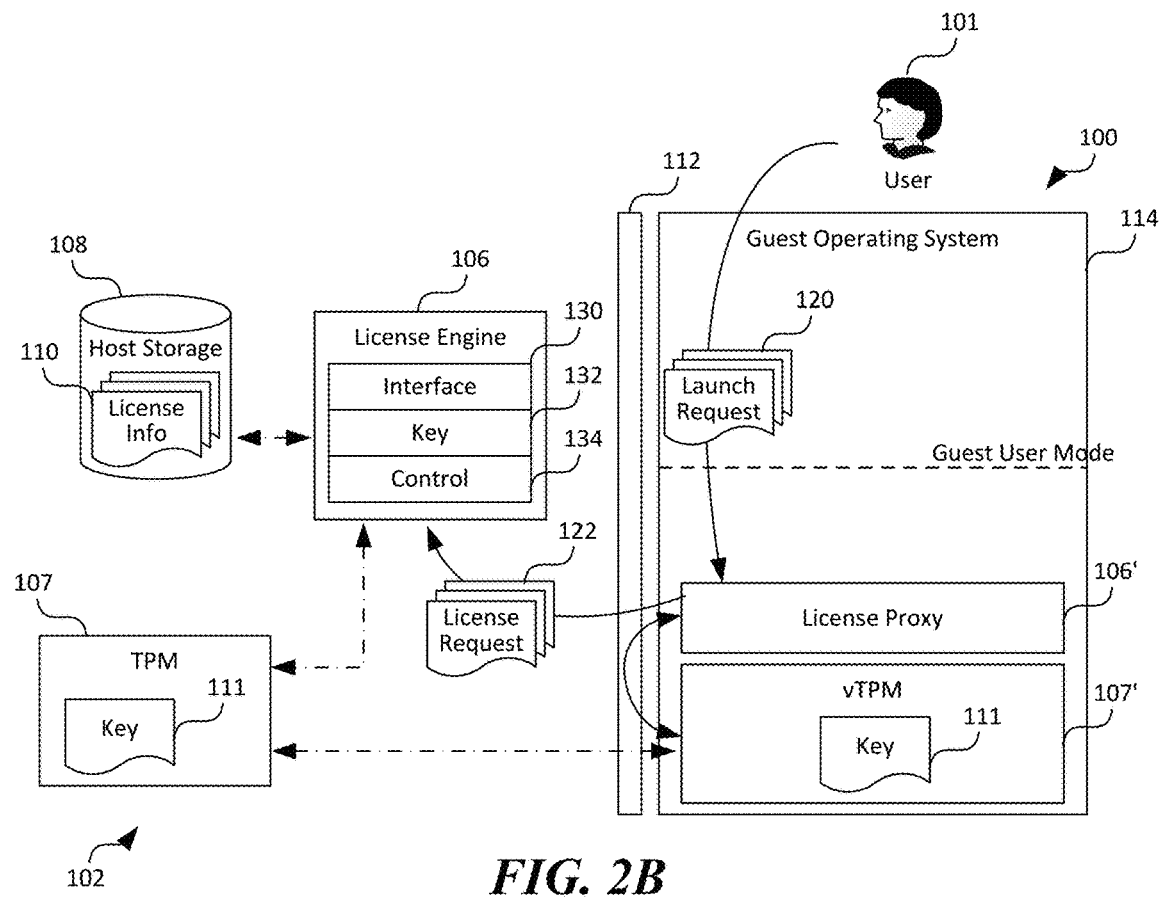

The foregoing cryptography key generating and sharing operations can facilitate secured exchange of data between the host operating system 102 and the guest operating systems 114. The secured exchange of data can include license information for launching application 116 (shown in phantom lines for clarity) in a user mode of the guest operating system 114. For example, as shown in FIG. 2B, the license proxy 106' can be configured to receive a launch request 120 from the user 101 (or a script, a computing service, another software application, or other suitable types of entity) to launch an application 116 (shown in FIG. 2D) in a user mode of the guest operating systems 114.

Figure 2C:
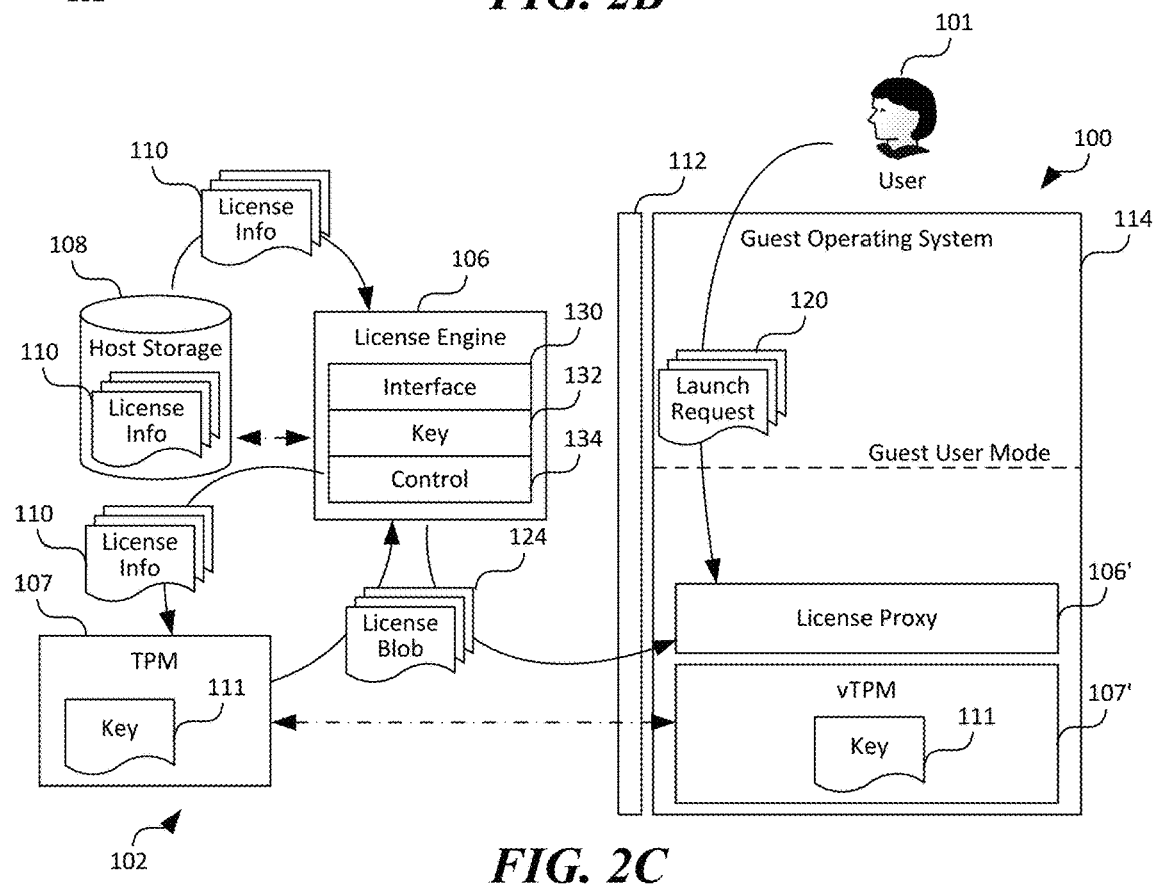

In response to receiving the launch request 120, the license proxy 106' can be configured to generate a license request 122 and request the vTPM 107' to encrypt the license request 122 with the previously exchanged key 111. The license proxy 106' can then forward the encrypted license request 122 to the license engine 106 in the host operating system 102 for further processing. As shown in FIG. 2C, in response to receiving the license request 122, the control component 134 of the license engine 106 can be configured to request the TPM 107 to decrypt the received license request 122 using another copy of the key 111 at the TPM 107. Based on the decrypted license request 122, the control component 134 can be configured to query the host storage 108 for corresponding license info 110. Upon locating the corresponding license info 110, the control component 134 can be configured to request the TPM 107 to encrypt the license info 110 using Data Encryption Standard (DES), Rivest-Shamir-Adleman (RSA), Blowfish, Twofish, Advanced Encryption Standard (AES), or other suitable encryption algorithms and generate an encrypted license blob 124.

In some embodiments, the license engine 106 (or one of its components) can also track attributes of individual guest operating systems (e.g., containers). Examples of such tracked attributes can include a container unique ID provisioned for a corresponding container, identities and/or versions of applications installed, current configurations of containers/applications, etc. The key component 132 of the license engine 106 may grant specific keys or restrict access to the stored license info 110 depending on such tracked attributes. For example, an anti-malware software (not illustrated) may indicate to the license engine 106 that the guest operating system 114 has an untrustworthy application 116 installed. As a result, the key component 132 can restrict access to the stored license info 110 by, for instance, not provisioning or expiring the key 111 in the TPM 107 for the guest operating system 114. When the health of guest operating system 114 is reported as good by the anti-malware software (e.g. the untrustworthy application 116 is deleted or uninstalled), the key component 132 can then re-provision a key 111 for the guest operating system 114.

Figure 2D:
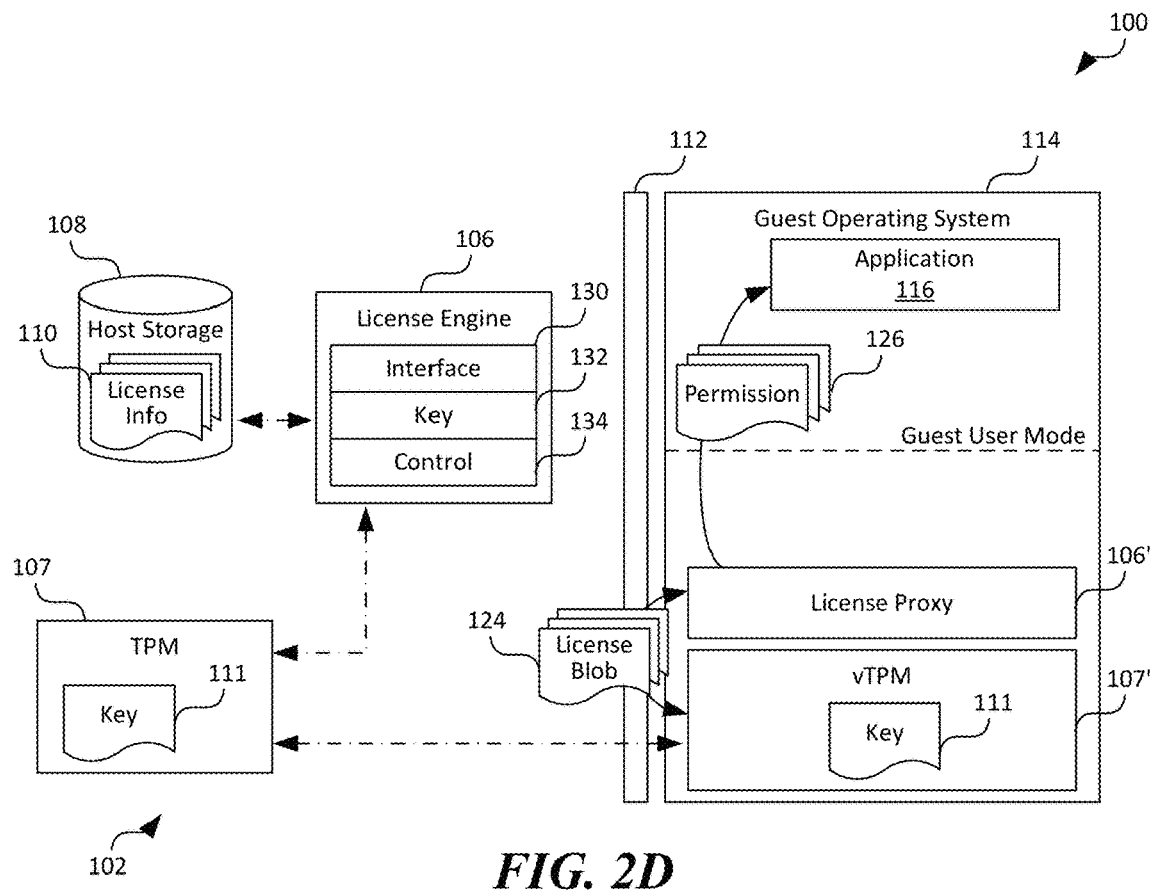

As shown in FIG. 2C, once the encrypted license blob 124 is generated, the control component 134 can instruct the interface component 130 to transmit the license blob 124 to the license proxy 106' of the guest operating systems 114 via, for instance, inter-process messages. The license proxy 106' of guest operating system 114 can then use request the vTPM 107' to use the corresponding key 111 to decrypt the license blob 124, as shown in FIG. 2D. The license proxy 106' can then query the decrypted license blob 124 in order to extract, for example, the license information for the application 116. Upon obtaining suitable license information, the license proxy 106' of can then issue a permission 126 to launch the application 116 in response to the launch request 120 from the user 101, issue an error message (not shown) denying the launch request 120, or perform other suitable operations. In some embodiments, the application 116 may be launched with reduced capabilities, for example, missing key features, in demonstration mode, etc. In some embodiments, the application 116 can be launched directly by the guest operating system 114, or by a task manager, a process manager, or other suitable components. In such embodiments, the permission 126 may be directly provided to the guest operating system 114 (or another suitable component) in charge of launching the application 116.

Figure 2E:
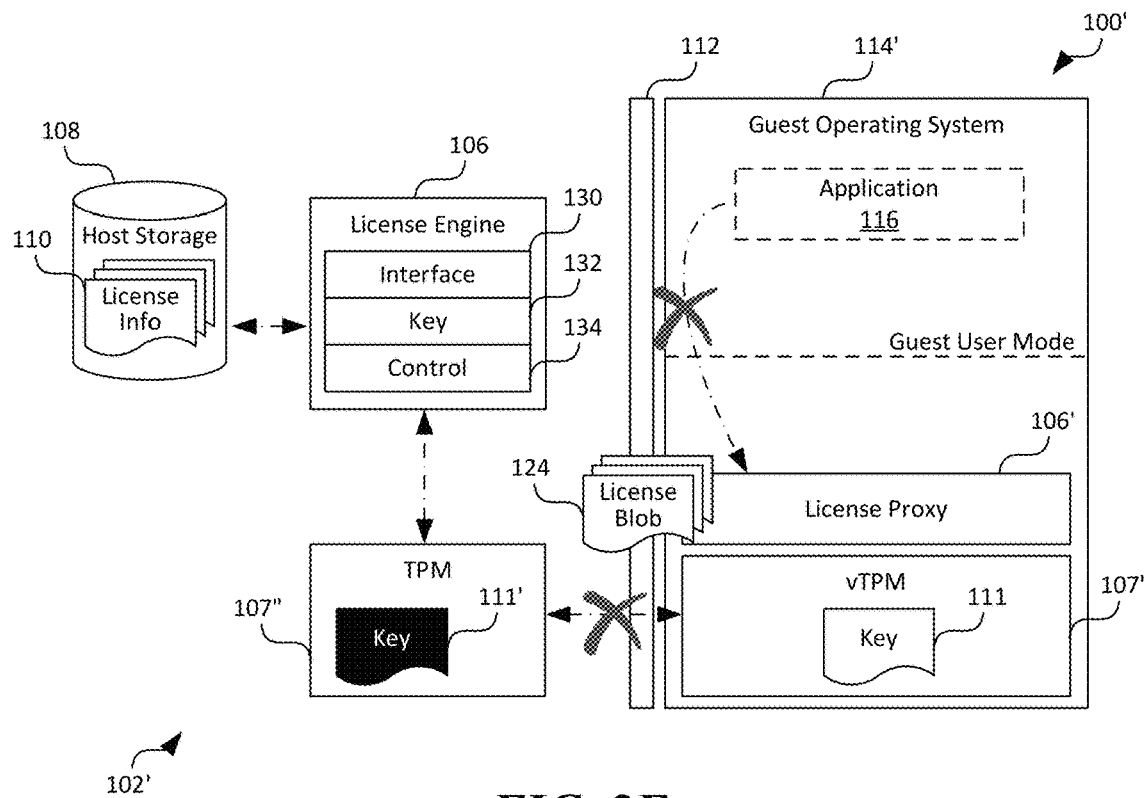

As shown in FIG. 2E, the user 101 may attempt to resume or relaunch the application 116 based on the encrypted license blob 124 in another guest operating system 114' on another host 100'. However, the application 116 in the user mode typically has no access to the license proxy 106' or the vTPM 107' in a kernel mode of the original guest operating system 114 (shown in FIG. 2D). As such, even though memory image of the application 116 may be copied from the original host 100 (shown in FIG. 2D), launching the application in the other host 100' still fails.

Even assuming that the user 101 could also copy data of the license proxy 106' and/or the vTPM 107', the copied data still would not allow launching the application 116 in the host 100'. As described in more detail above with reference to FIG. 2A, the vTPM 107' is bound to the original TPM 107 on the original host 100. As such, even though data of the vTPM 107' may be copied to the host 100', the vTPM 107' would still be non-functioning because the vTPM 107' is not bound to the new TPM 107" on the new host 100'. As such, attestation or other suitable operations related to the vTPM 107' and the TPM 107" would fail, and thus rendering the decryption of the copied license blob 124 to fail.

Several embodiments of the disclosed technology can thus provide a seamless experience with applications 116 while reducing or even preventing risks of software piracy and/or leaks of sensitive information. When sharing any sensitive information (e.g., the license info 110) with the guest operating systems 114, the shared data is encrypted with the key 111 at the TPM 107. The license blob 124 can then be decrypted at the guest operating systems 114 with a corresponding key 111 at the vTPM 107'. The sharing of the key 111, however, may be voided when a binding between the vTPM 107' and the TPM 107 is broken. As such, the previously shared license blob 124 may not be decrypted with the new key 111'. Thus, data security of the sensitive information can be protected.

In certain embodiments, one license is used per application 116. In other embodiments, one or more applications 116 can be bundled to require a single license. In further embodiments, the application 116 may have "guest aware" licensing. In such embodiments, licenses for the host operating system 102 and multiple guest operating systems 114 may be pre-allocated or pre-generated and stored in the host storage 108. The license engine 106 can then selectively re-allocate these licenses to the guest operating systems 114. This technique can be useful in to facilitate operations of nested operating systems in which a first guest operating system 114 is also hosting a nested second guest operating system 114. In this scenario, the first guest operating system 114 can be configured to execute suitable instructions to provide its own license engine 106, which would receive one of the pre-allocated licenses to share with the nested second guest operating system (or additional guest operating systems 114) in a manner generally similar as those described above with reference to FIGS. 2A-2E.

Even though operations of the host 100 are described above using a symmetric key 111 for illustration purposes, in other embodiments, the TPM 107 and vTPM 107' can operate with key pairs. For example, during initialization of the guest operating system 114, the TPM 107 can generate and share a public key and a private key with the vTPM 107'. The TPM 107 can also share a public key of the TPM 107 with the vTPM 107'. During operation, instead of encrypting the license blob 124 using the symmetric key 111, the TPM 107 can encrypt the license blob 124 using the public key of the vTPM 107'. Upon receiving the license blob 124, the vTPM 107' can then decrypt the license blob 124 using the corresponding private key. Similarly, the vTPM 107' can be configured to encrypt data (e.g., the launch request 120) using the public key of the TPM 107, which in turn can decrypt the encrypted launch request 120 using a corresponding private key of the TPM 107.

In some embodiments, the host license info 110 can change due to, for example, expiration, revocation, update, etc. When a change in the license info 110 occurs, the license engine 106 can communicate to the license proxy 106' to update the license blob 124. In some embodiments, the update can include to synchronize information between the host and the guest operation systems 102 and 114. In other embodiments, aspects of a "grace period" or other notifications of the change may be implemented. In some embodiments, the license engine 106 has monitoring abilities to ensure that the license proxy 106' is compliant in terms of licenses, application policies, and/or active configurations. For example, in a datacenter in which many guest operating systems 114 are running, there may be a requirement that license engine 106 provides compliance reports to a management entity (e.g., a fabric controller, not illustrated). In some embodiments, when the license engine 106 determines a guest operating system 114 is non-compliant, the license engine 106 can be configured to remediate, e.g., via resetting or terminating the guest operating system 114, or via other suitable actions.

Figure 3A:
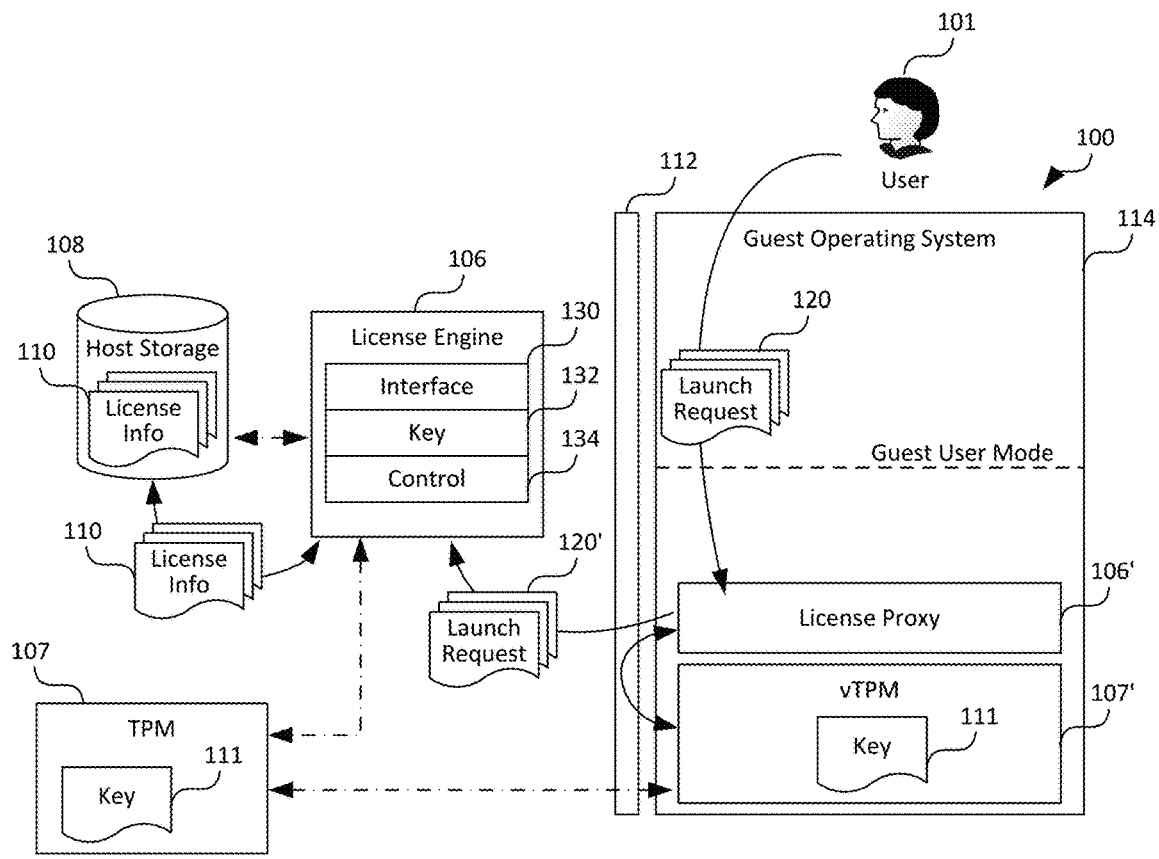
FIGS. 3A and 3B are schematic diagrams of certain hardware/software components of the host of FIG. 1 during additional stages of operation in accordance with embodiments of the disclosed technology.
Figure 3B:
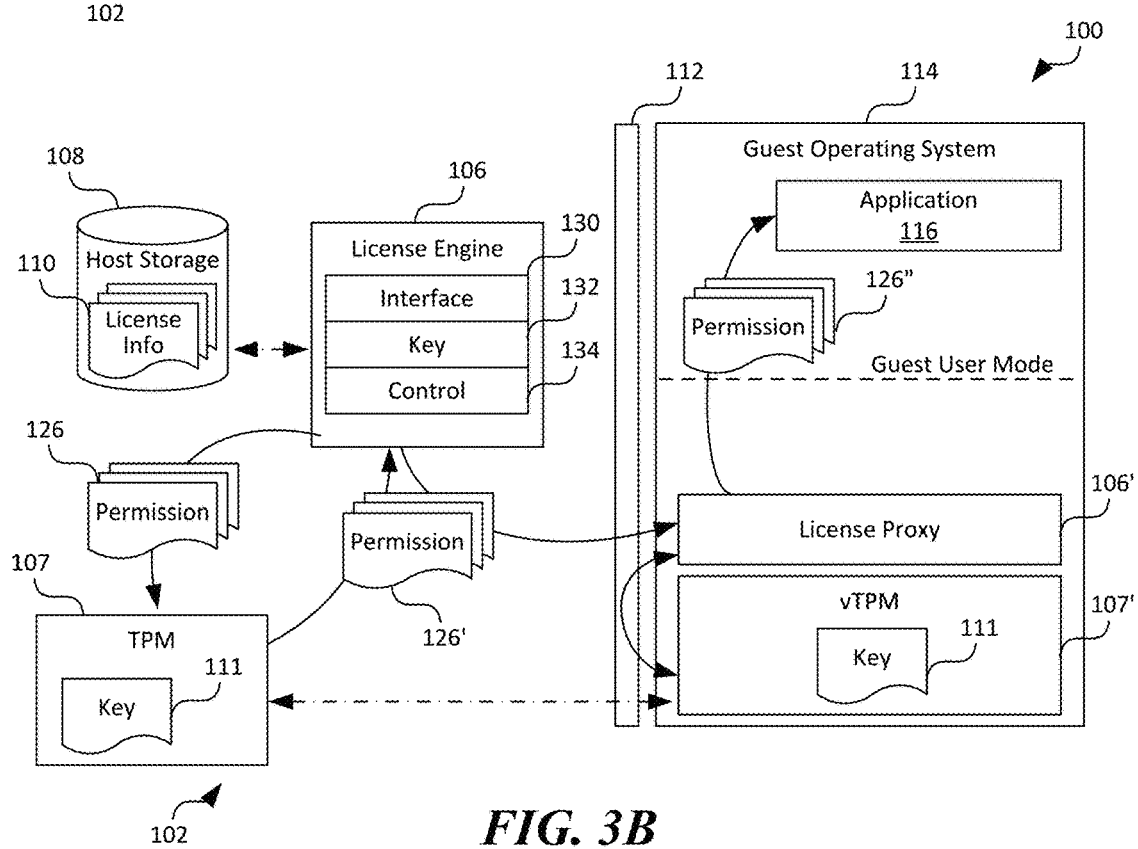

FIGS. 2A-2E illustrate a technique of protecting the license info 110 or other suitable types of sensitive information by encrypting the license blob 124. In other embodiments, the entire licensing determination may be performed by the license engine 106 at the host operating system 102. For example, as shown in FIG. 3A, instead of requesting for license information from the license engine 106 at the host operating system 102, the license proxy 106' can be configured to request the vTPM 107' to encrypt the launch request 120 with the key 111. The license proxy 106' can then transmit the encrypted launch request 120' to the license engine 106 for further processing. Upon receiving the encrypted launch request 120', the control component 134 of the license engine 106 can be configured to request the TPM 107 to decrypt the received launch request 120'. Based on the decrypted launch request 120', the control component 134 can be configured to query for corresponding license info 110 in the host storage 108. As shown in FIG. 3B, upon performing suitable license determinations, the control component 134 can be configured to generate a permission 126 and request the TPM 107 to encrypt the permission 126 with the key 111. The control component 134 can then request the interface component 130 to transmit the encrypted permission 126' to the license proxy 106'. Upon receiving the encrypted permission 126', the license proxy 106' can request the vTPM 107' to decrypt the permission 126'. Based on the decrypted permission 126', the license proxy 106' can issue corresponding permission 126" to, for instance, launch the application 116 in a user mode of the guest operating system 114.

In some embodiments, components of the host operating system 102 can be provided as individual computing services provided by, for instance, a set of servers in a datacenter, or a set of rented compute, network, and storage resources, also known as "cloud services". For example, the cloud services may perform the same functionality as various components of the host operating system 102 as described above, but interact with the guest operating systems 114 over a network connection, via shared storage, or via other suitable techniques. A centralized licensing engine service (not shown) may enable improved security in which the guest operating systems 114 have a lower trust in the host operating system 102. A centralized licensing engine service may also simplify provisioning and management of various computing resources by deploying a central license engine and license storage.

Even though the operations of the license engine 106 and license proxy 106' are described above in the context of initializing or launching an application 116 in a guest operating system 114 at a host 100, in other embodiments, similar operations can also be performed for initializing one or more guest operating systems 114 in the host 100. For example, upon receiving a user request to initialize a guest operating system 114 (e.g., for a virtual machine), a key 111 (or key pair) can be provisioned for and shared with the guest operating system 114, as described above with reference to FIG. 2A. The host operating system 102 can then generate a suitable license blob 124 based on the license info 110 for the guest operating system 114 using the provisioned key 111, as described above with reference to FIG. 2C. The license proxy 106' can then decrypt the license blob 124 with the shared key 111 to determine license information for the guest operating system 114, as described above with reference to FIG. 2D.

Figure 4A:
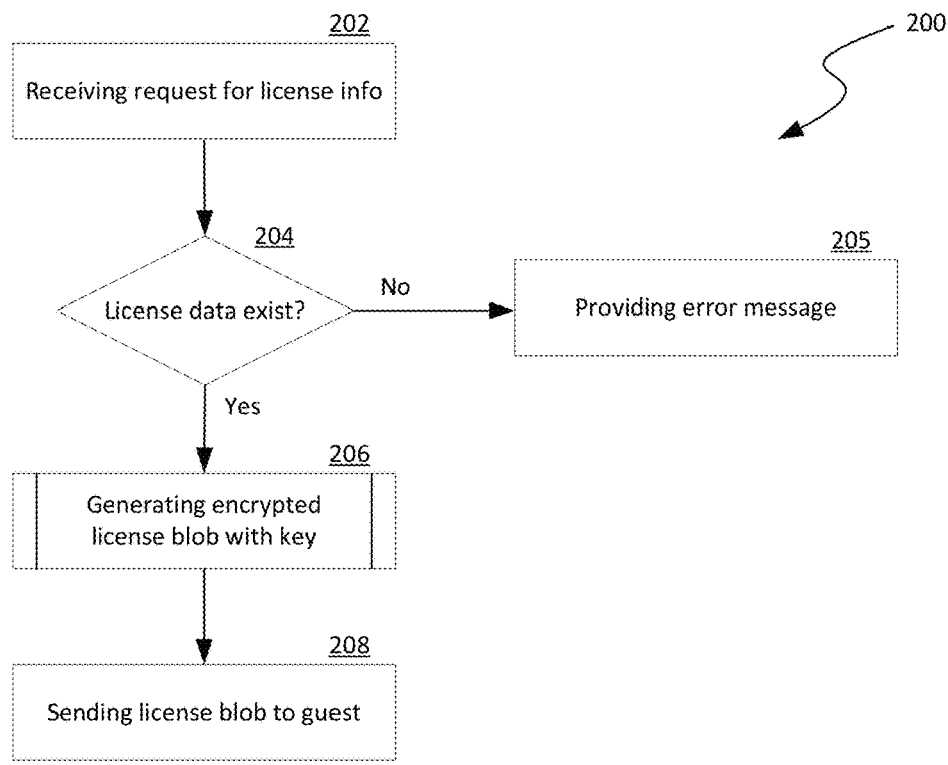
FIGS. 4A-4C are flowcharts illustrating certain processes of memory assignment for guest operating systems in accordance with embodiments of the disclosed technology.
Figure 4B:
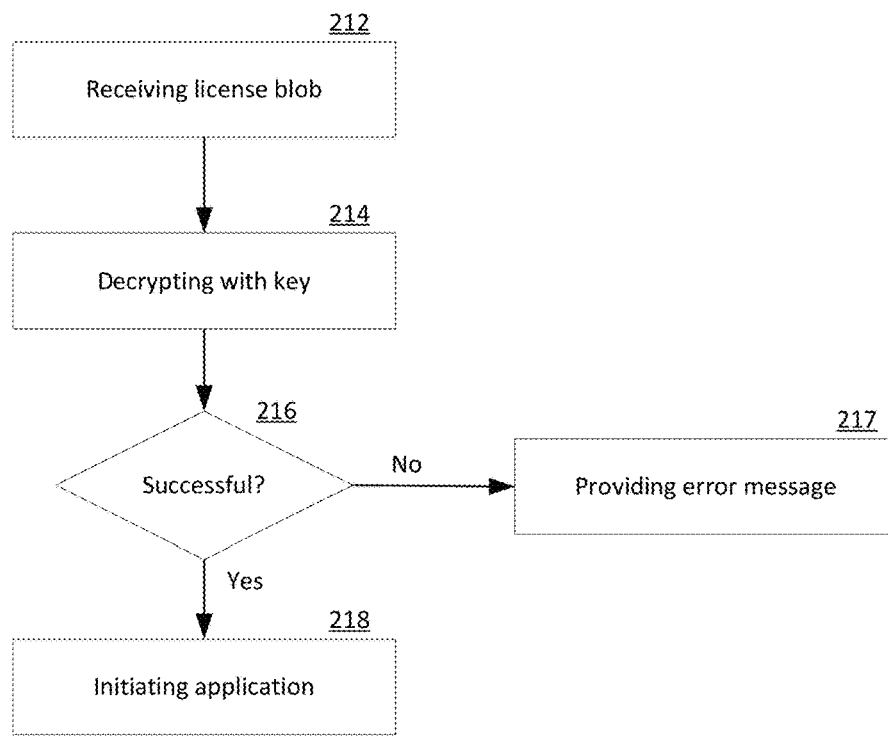
Figure 4C:
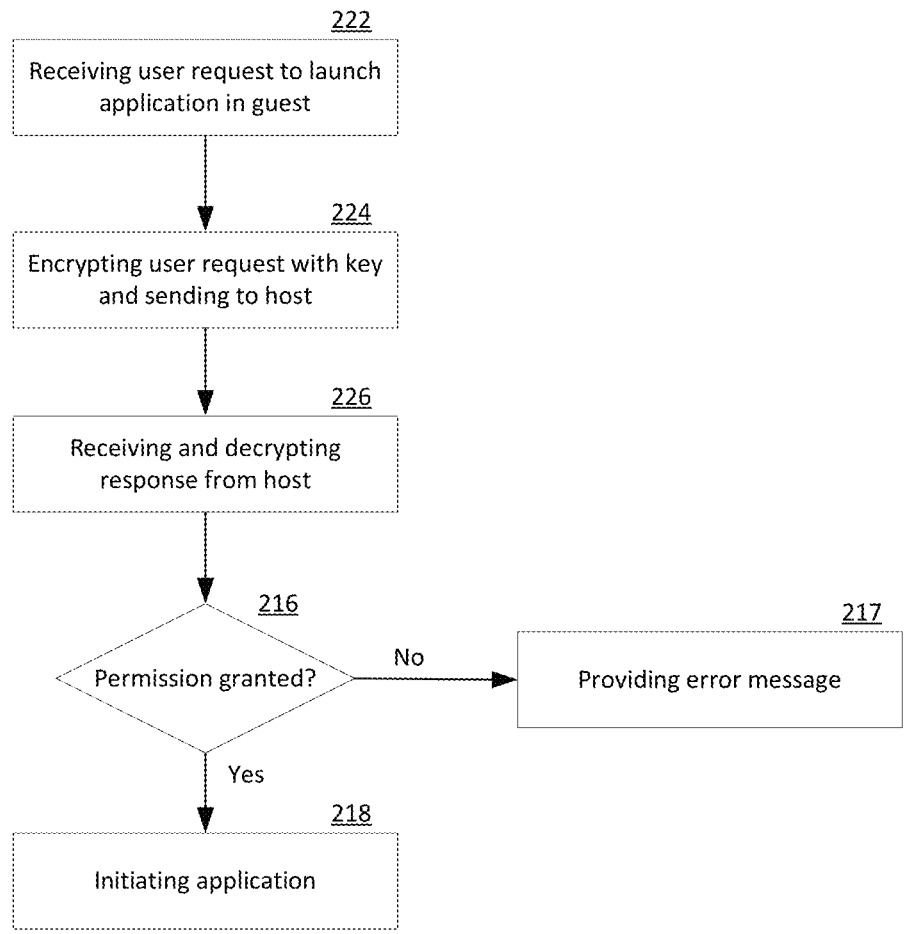

FIGS. 4A-4C are flowcharts illustrating certain processes of secure data exchange between host and guest operating systems in accordance with embodiments of the disclosed technology. Even though embodiments of the processes are described below with reference to the host 100 of FIGS. 1-3B, in other embodiments, one or more of the processes may be implemented in a host with additional and/or different hardware/software components. In addition, license information and launching of corresponding applications are used below as examples of data exchanged and tasks performed. Embodiments of the technique described below may also be applied to securely exchange login credentials, personal information, or any other suitable sensitive information and corresponding user login, user data submission, or other suitable tasks.

As shown in FIG. 4A, a process 200 includes receiving a license request related to launching an application in a user mode of a guest operating system at stage 202. In response to receiving the license request, the process 200 can include a decision stage 204 to determine whether license information corresponding to the application exists in or is accessible by a host operating system. In one implementation, data of the license information can be stored in a file system on a host and accessible to the host operating system. In another implementation, data of the license information can be stored on a remote server and accessible to the guest operating system via a computer network, such as the Internet.

In response to determining that the license information is not available, the process 200 can include providing an error message at stage 205. Otherwise, the process 200 proceeds to generating an encrypted license blob for the guest operating system based on the available license information and a key previously exchanged with the guest operating system at stage 206. Then, the process 200 can include sending the encrypted license blob to the guest operating system at stage 208. The guest operating system can then extract the license information from the encrypted license blob using a corresponding key, as described in more detail above with reference to FIGS. 2A-2E. Example operations for decrypting the encrypted license blob are described in more detail below with reference to FIG. 4B.

As shown in FIG. 4B, the example operations for decrypting the encrypted license blob can include receiving the encrypted license blob at stage 212. The operations can then include locating a key of the guest operating system and decrypting the license blob with the key at stage 214. The operations can then include a decision stage 216 to determine whether the decryption operation is completed successfully. In response to determining that the decryption completed successfully, the operations can include extracting suitable license information from the decrypted data and initiating the application at stage 218. Otherwise, the operations can include providing an error message at stage 217.

FIG. 4C illustrate example operations for passing license determination to a license engine in a host operating system. As shown in FIG. 4C, the operations can include receiving a user request to launch an application in a user mode of a guest operating system at stage 222. The operations can then include encrypting the user request with a key previously issued by a TPM of the host and sending the encrypted launch request to the host operating system at stage 224. The operations can then include receiving and decrypting a license response from the host operation system using the key at stage 226. The operations can then include stages 216, 217, and 218 generally similar to those described above with reference to FIG. 4B.

FIG. 5 is a computing device 300 suitable for the host 100 in FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (μP), a microcontroller (μC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 10 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

Specific embodiments of the technology have been described above for purposes of illustration. However, various modifications can be made without deviating from the foregoing disclosure. In addition, many of the elements of one embodiment can be combined with other embodiments in addition to or in lieu of the elements of the other embodiments. Accordingly, the technology is not limited except as by the appended claims.

We claim:

1. A method of secure data exchange between a host operating system and a guest operating system hosted by the host operating system on a host having a trusted platform module (TPM) accessible to the host operating system, the method comprising:
   receiving, at a guest operating system, a request to launch an application in the guest operating system; and
   in response to receiving the request,
      transmitting, to the host operating system, a license request for license information corresponding to the application;
      receiving, from the host operating system, a license blob from the host operating system, the license blob containing encrypted license information of the application, the encrypted license information allowing the application to be launched in the guest operating system;
      decrypting, at the guest operating system, the received license blob using a virtual TPM of the guest operating system having a key previously exchanged between the TPM of the host and the virtual TPM of the guest operating system, wherein the virtual TPM is bound to the TPM of the host; and
      launching the application in the guest operating system based on the license information in the decrypted license blob that allows the application to be launched in the guest operating system, thereby enabling secured license data exchange between the host and guest operating systems via the virtual TPM bound to the TPM of the host.

2. The method of claim 1 wherein the virtual TPM at the guest operating system is bound to the TPM at the host by a binding key.

3. The method of claim 1, further comprising:
   generating the key at the TPM of the host during initialization of the guest operating system; and
   sharing the key generated by the TPM with the virtual TPM at the guest operating system during initialization of the guest operating system.

4. The method of claim 1 wherein:
   receiving the request includes receiving the request at a license proxy of the guest operating system; and
   transmitting the license request includes:
      requesting, from the license proxy, encryption of the license request by the virtual TPM using the key; and
      transmitting the encrypted license request to the host operating system.

5. The method of claim 1 wherein:
   receiving the request includes receiving the request at a license proxy of the guest operating system; and
   transmitting the license request includes:
      requesting, from the license proxy, encryption of the license request by the virtual TPM;
      encrypting, at the virtual TPM, the license request with the key; and
      transmitting the encrypted license request to the host operating system.

6. The method of claim 1, further comprising:
   tracking an attribute of the guest operation system or an application executing in the guest operating system; and
   based on the tracked attribute, performing one or more of:
      selectively expiring the key in the virtual TPM of the guest operating system; or
      denying a grant of license or launch permission to the guest operating system for launching the application in the guest operating system.

7. The method of claim 1 wherein:
   the key is a symmetric key previously exchanged between the TPM of the host and the virtual TPM of the guest operating system;
   receiving the license blob includes receiving the license blob encrypted using the symmetric key; and
   decrypting the received license blob includes decrypting, at the virtual TPM, the received license blob using a copy of the symmetric key at the virtual TPM of the guest operating system.

8. The method of claim 1 wherein:
   the key is a private key of the virtual TPM of the guest operating system;
   receiving the license blob includes receiving the license blob encrypted using a public key of the virtual TPM of the guest operating system; and
   decrypting the received license blob includes decrypting, at the virtual TPM, the received license blob using the private key of the virtual TPM at the guest operating system.

9. The method of claim 1 wherein:
   the virtual TPM also contains a public key of the TPM of the host; and
   the method further includes, in response to receiving the request,
      encrypting, at the virtual TPM, the license request with the public key of the TPM of the host; and
      transmitting the encrypted license request for license information corresponding to the application to the host operating system.

10. A computing device having a host operating system and a guest operating system hosted by the host operating system, the computing device comprising:
   a processor;
   a trusted platform module (TPM) accessible to the host operating system; and a memory operatively coupled to the processor and the TPM, the memory containing instructions executable by the processor to cause the computing device to:
upon receiving a launch request for launching an application in the guest operating system,
generate, using the TPM at the host, a license blob by encrypting data of license information of the application accessible to the host operating system, the encrypted data of license information allowing the application to be launched in the guest operating system;
transmit the generated license blob from the host operating system to the guest operating system;
decrypt, at the guest operating system, the transmitted license blob using a virtual TPM of the guest operating system having a key previously exchanged between the TPM) accessible to the host operating system and the virtual TPM of the guest operating system to extract the data of license information, wherein the virtual TPM is bound to the TPM of the computing device; and
initialize the application in the guest operating system according to the extracted data of license information that allows the application to be launched in the guest operating system, thereby enabling secured license data exchange between the host and guest operating systems in the computing device via the virtual TPM bound to the TPM of the computing device.

11. The computing device of claim 10 wherein the memory contains additional instructions executable by the processor to cause the computing device to bind the virtual TPM of the guest operating system to the TPM of the host operating system with a binding key.

12. The computing device of claim 10 wherein the memory contains additional instructions executable by the processor to cause the computing device to:
generate the key at the TPM of the host operating system during initialization of the guest operating system; and
share the key generated by the TPM with the virtual TPM at the guest operating system during initialization of the guest operating system.

13. The computing device of claim 10 wherein the memory contains additional instructions executable by the processor to cause the computing device to:
track an attribute of the guest operation system or an application executing in the guest operating system; and
based on the tracked attribute, selectively expire the key in the virtual TPM of the guest operating system.

14. The computing device of claim 10 wherein:
the key is a symmetric key previously exchanged between the TPM of the host operating system and the virtual TPM of the guest operating system; and
to decrypt the transmitted license blob includes to decrypt, at the virtual TPM, the transmitted license blob using a copy of the symmetric key at the virtual TPM of the guest operating system.

15. The computing device of claim 10 wherein:
the key is a private key of the virtual TPM of the guest operating system; and
to decrypt the transmitted license blob includes to decrypt, at the virtual TPM, the transmitted license blob using the private key of the virtual TPM at the guest operating system.

16. The computing device of claim 10 wherein:
the virtual TPM also contains a public key of the TPM of the host; and
the memory contains additional instructions executable by the processor to cause the computing device to
encrypt, at the virtual TPM, a license request with the public key of the TPM of the host; and
decrypt, at the TPM, the encrypted license request with a private key of the TPM of the host.

17. A method of secure data exchange between a host operating system and a guest operating system hosted by the host operating system on a host having a trusted platform module (TPM) accessible to the host operating system:
upon receiving a launch request for launching an application in the guest operating system,
generating, using the TPM at the host, a license blob by encrypting data of license information of the application accessible only to the host operating system, the encrypted data of license information allowing the application to be launched in the guest operating system;
transmitting the generated license blob from the host operating system to the guest operating system;
decrypting, at the guest operating system, the transmitted license blob using a virtual TPM of the guest operating system having a key previously exchanged between the TPM of the host and the virtual TPM of the guest operating system to extract the data of license information, wherein the virtual TPM is bound to the TPM of the host; and
initializing the application in the guest operating system according to the extracted data of license information that allows the application to be launched in the guest operating system, thereby enabling secured license data exchange between the host and guest operating systems in the computing device via the virtual TPM bound to the TPM of the host.

18. The method of claim 17, further comprising binding the virtual TPM of the guest operating system to the TPM of the host operating system with a binding key.

19. The method of claim 17, further comprising:
generating the key at the TPM of the host operating system during initialization of the guest operating system; and
sharing the key generated by the TPM with the virtual TPM at the guest operating system during initialization of the guest operating system.

20. The method of claim 17, further comprising:
tracking an attribute of the guest operation system or an application executing in the guest operating system; and
based on the tracked attribute, selectively expiring the key in the virtual TPM of the guest operating system.

* * * * *